Aug. 15, 1944.  E. J. ELLIS  2,355,962

RAILWAY BRAKE GEAR SUPPORT

Filed July 9, 1942  2 Sheets-Sheet 1

INVENTOR
EDWARD J. ELLIS
BY Rodney Bedell
ATTORNEY

Aug. 15, 1944.  E. J. ELLIS  2,355,962
RAILWAY BRAKE GEAR SUPPORT
Filed July 9, 1942   2 Sheets-Sheet 2

INVENTOR
EDWARD J. ELLIS
BY Rodney Bedell
ATTORNEY

Patented Aug. 15, 1944

2,355,962

UNITED STATES PATENT OFFICE 2,355,962

RAILWAY BRAKE GEAR SUPPORT

Edward J. Ellis, Chicago, Ill., assignor to Chicago Railway Equipment Company, Chicago, Ill., a corporation of Illinois Application July 9, 1942, Serial No. 450,260

11 Claims. (Cl. 188—210)

The invention relates to railway trucks, and more particularly to the supporting, guarding and guiding of brake gear parts applied to the truck wheels. The support, guard or guide device may be of the type disclosed in Patent No. 2,146,111, issued to the present applicant February 7, 1939.

The main objects of the present invention are to provide a more secure mounting of the device on the truck bolster, or other part to which it is attached, to prevent play or undesired vibration between the device and the truck part and to make it possible to use a support, guard or guide device of cold, rolled steel as distinguished from one of spring material or, if spring material is used, to provide for the proper assembly of the same with the truck part if the material loses its elasticity and takes a permanent set.

In the accompanying drawings illustrating selected embodiments of the invention—

Figure 1:
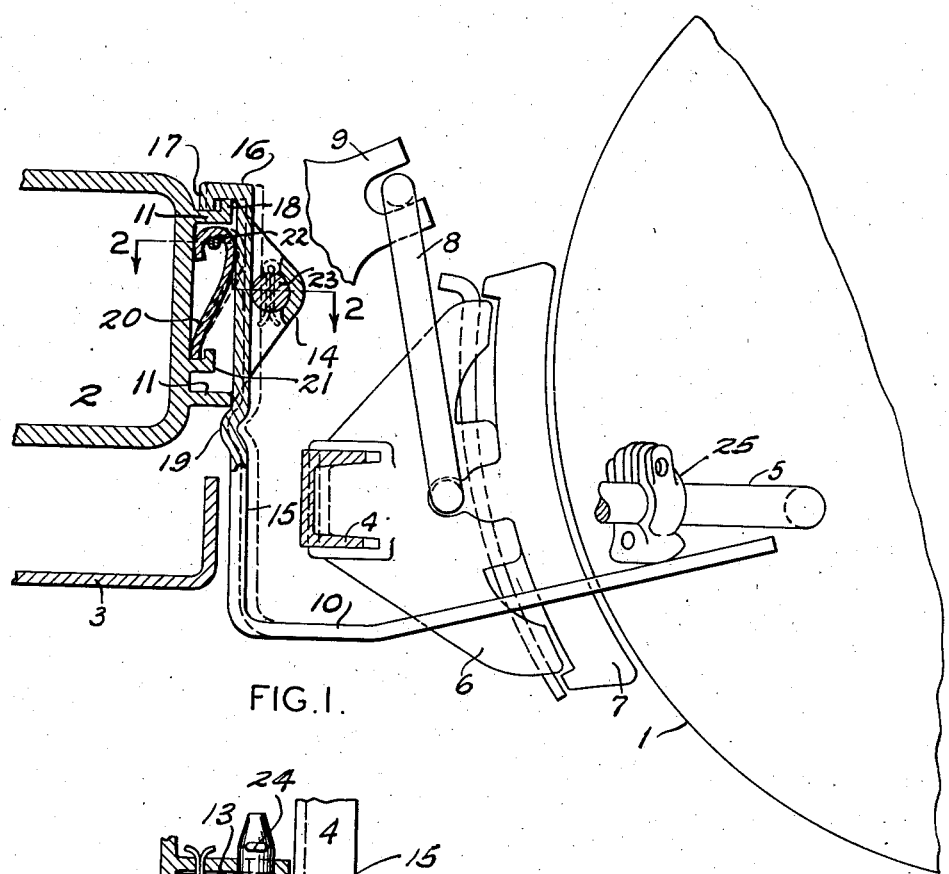
Figure 1 is a vertical longitudinal section through a portion of a railway truck showing those parts essential to a disclosure of the present invention.

In Figure 1 a portion of one of the truck wheels is indicated at 1 and a portion of the truck bolster is shown at 2. It will be understood that the bolster is supported from the truck wheels by journal boxes, framing and, preferably, by springs, none of which bolster supporting parts are illustrated but they are well known in the art and form no part of the present invention.

The frame may mount a spring plank indicated at 3 but the invention is particularly adapted for spring plankless type of trucks. A truss type brake beam is shown with the usual compression member 4 and tension rod 5, the brake head 6 and shoe 7 being mounted on the end of the beam. Normally the beam will be carried by hangers 8 suspended from brackets 9 on the truck frame, but in the event of failure of the normal support the beam will be held against dropping to the rail by the safety device 10 which is mounted upon the bolster. To this end the bolster side wall is provided with a bracket structure including upper and lower horizontal flanges 11 and spaced vertical webs 13 connected at their outer ends by a bar 14. The upper end of the upright arm 15 of the safety device has an inwardly turned flange 16 with a downwardly turned lip 17 overlying the upper flange 11 on the bolster, the latter preferably having an upturned lip 18 overlapping the front of lip 17 to check forward movement of the latter. Arm 15 is crimped at 19 to engage lower flange 11 and check its upward movement from the normal position shown in full lines.

A vibration absorbing spring 20 is positioned between arm 15 and the bolster wall with its lower end supported in a pocket forming element 21 on the bolster wall and with its upper end curved about a removable cotter pin 22 seated in spaced webs 13. A pin 23, having a tapered end, is inserted through suitable apertures in webs 13 and forces arm 15 to the left against the thrust of spring 20, distorting the latter from its normal contour, indicated by broken lines, to the solid line position shown. Cotter 24 retains pin 23 in position.

With this construction and with pin 23 removed, the upper portion of arm 15 may be inserted upwardly through the passage of bar 14 and the outer edges of flanges 11 until its flange 16 and lip 17 clear lip 18, whereupon the member may be moved inwardly and dropped into the broken line position. Thereafter pin 23 may be inserted and driven home, bar 14 forming a guide and backing for the pin throughout its movement. This will bring crimp 19 beneath the lower flange 11 and lock the device against accidental removal.

By shaping spring 20 so that its contact with arm 15 will be above the axis of pin 23, the arm will be engaged at three points spaced apart vertically of the bracket and will be held against the edge of lower flange 11 by pin 23 and by spring 20 so that its upper end does not vibrate against the outer end of upper flange 11.

With this arrangement, spring 20 acts to prevent vibration or chattering of the support device in its mounting irrespective of any elasticity in the device itself, and the device is retained against accidental removal and loss due to distortion under load. In the event of loss of the retaining pin, spring 20 will thrust lip 17 against lip 18 and the friction between these parts should avoid the arm being bounced out of supported position until after an inspection has caused the replacement of pin 23.

If the horizontal portion of the device is extended, as shown, the beam may be provided with a chair 25, whereby the device acts as a guide to control the angular disposition of the beam and shoe in a vertical plane extending longitudinally of the truck, thus avoiding the dragging of either end of the brake shoe on the wheel. If it is only desired to use the device for a safety support, then the horizontal arm may be shortened to include only that portion underlying the beam compression member 4.

Figure 3:
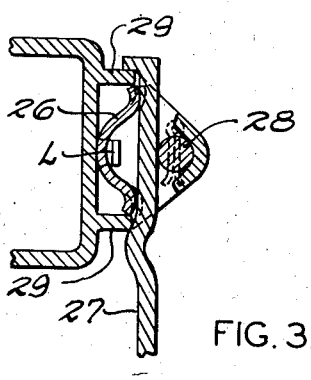
Figures 3, 4, 5, 6, 8 and 10 are respective detail vertical sections through modified forms of the device, Figure 8 being taken on the section line 8—8 of Figure 9.

Figure 3 illustrates an arrangement in which the vibration absorbing spring 26 is reversed so that its end portions bear against the upright arm 27 of the safety device above and below the axis of pin 28 and it will not be necessary for the device arm to bear against either of the bolster flanges 29 although such contact is shown at the lower flange. The spring is retained in position by lugs L projecting towards each other from the opposing vertical webs of the bracket.

Figure 2:
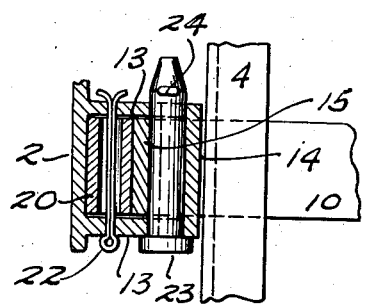
Figure 2 is a horizontal section taken on the line 2—2 of Figure 1.
Figure 4:
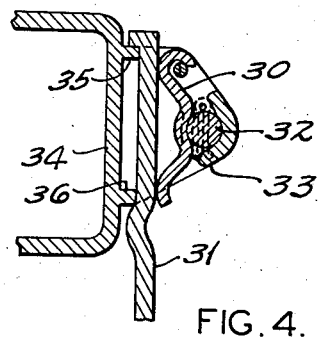

Figure 4 illustrates another arrangement in which the vibration absorbing spring 30 is positioned outwardly of the upright arm 31 of the support device and is directly engaged and distorted by pin 32 as the latter is driven into its seat in the bracket 33 extending from the bolster side wall 34. With this arrangement, both ends of the spring bear against the outer face of arm 31 and thrust the latter against the outer edges of both upper and lower horizontal flanges 35 and 36. The manner of assembling and retaining the parts and their functioning correspond to that of the arrangement shown in Figures 1 and 2.

Figure 5:
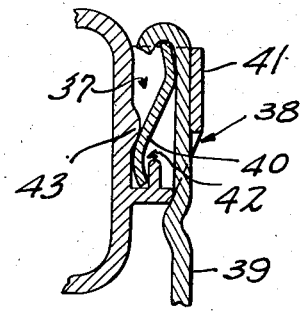

Figure 5 illustrates another arrangement in which the bolster bracket forms an upwardly opening pocket 37 having a downwardly and outwardly opening aperture 38 through which the upper end of the safety device upright arm 39 may be inserted and thrust against the vibration absorbing spring 40 distorting the latter inwardly until the hook upper end of arm 39 rides over the upper end of spring 40 and the latter will assume the full line position shown forming a support for member 39 as well as thrusting the latter outwardly against the transverse bar 41 of the bracket. The bracket forms a pocket 42 for receiving the lower end of spring 40 and the bolster wall has a projection 43 against which the spring may bear midway of its length. This arrangement avoids the use of the tapered pin although, if desired, such an element could be inserted between arm 39 and bar 41.

Figure 6:
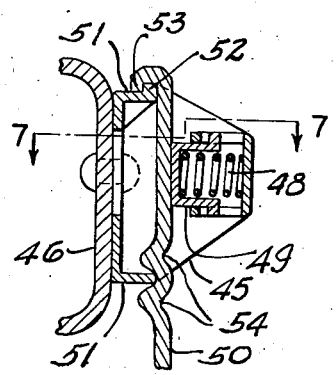
Figure 7:
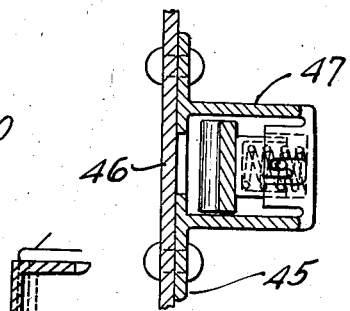
Figure 7 is a horizontal section taken on the line 7—7 of Figure 6.

Figures 6 and 7 illustrate another form of the invention in which the bracket 45 is formed separately from the bolster and riveted to the side wall 46 of the latter and has a cylindrical boss 47 forming an inwardly facing pocket receiving a coil spring 48 provided with a follower 49 which bears against the outer face of the upright arm 50 of the safety device to thrust the latter against the outer edges of horizontal flanges 51, the upper of which has an up-turned lip 52 arranged to overlap a down-turned lip 53 on the upper end of the safety device arm. A double crimp in the arm, as indicated at 54, cooperates with interengaging lips 52 and 53 and the spring member to hold the arm and bracket interlocked.

Figure 8:
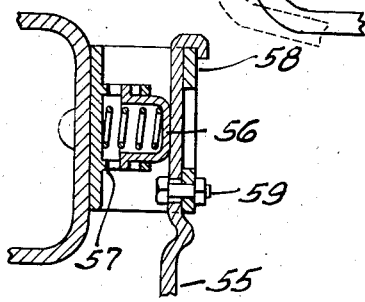
Figure 9:
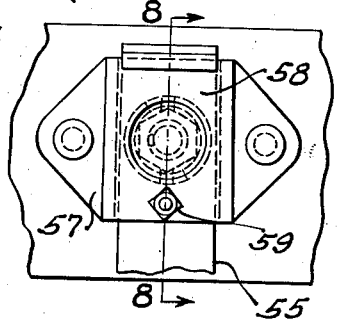
Figure 9 is an elevation of the structure shown in Figure 8.

Figures 8 and 9 illustrate a similar form of the invention in which the relative position of the support arm 55 and the spring device 56 is reversed, the pocket forming boss 57 being formed on the inner wall of the bracket and the upper end of the arm being hooked over the cross bar 58 on the bracket. A retaining bolt 59, or similar element, holds the arm against disassembly but the spring device holds the bracket against undesirable play.

Figure 10:
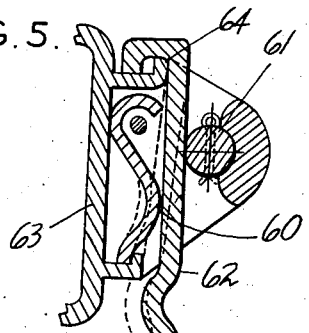

Figure 10 illustrates another form of the invention similar to that shown in Figure 1 but in which the relation between the retaining pin and the spring is shifted so that the contact at 60 between these parts is below the axis of pin 61, whereby the lower portion of upright arm 62 is thrust away from the bolster wall 63 and the upper portion of the upright arm is thrust towards the bolster wall and engages the outer edge of bracket 64. Except as noted, the parts function as described above in connection with the structure shown in Figure 1.

Each of the above-described arrangements contemplates the provision of a spring element separate from the safety device for preventing vibration of the latter and holding it in interlocked relation with the mounting bracket, but it will be understood that the construction does not negative the making of the support device of spring material, if for any reason that this should be desirable, so that it could be interchangeable with different types of mounting brackets not adapted for the additional spring member.

What is claimed is:

1. In a mounting for a railway truck brake gear safety guard, guide or support device having an upright arm, a truck part provided with three elements arranged at different levels so as to engage opposite sides of the upright arm, at least one of said elements being elastic and carried by one of the other elements, irrespective of the presence of the support device, and accommodating assembly of the device arm with the mounting and holding the device arm against play in the mounting.

2. A mounting for a railway truck brake gear safety guard, guide or support device comprising a bracket with laterally facing parts and an upwardly opening pocket, an element spaced above the level of said pocket and disaligned vertically from said pocket, and a spring seated in said pocket and extending upwardly and laterally thereof towards said element and distortable by a safety device arm inserted between said spring and element so as to hold the arm in contact with said element and one of said bracket parts.

3. In a mounting for a railway truck brake gear safety guard, guide or support device having an upright arm, a truck part having an upright wall with vertically spaced horizontal flanges projecting therefrom, a spring seated against said wall and normally projecting therefrom a greater distance than said flanges, there being laterally spaced projections on said wall adjacent to said flanges and projecting from the wall a greater distance than said flanges and there connected by a cross bar, said bar and spring being arranged to receive the upright arm of the device between them, and a pin detachably seated in said bar and holding the upright arm of the device in contact with said spring and one of said flanges.

4. In a mounting for a railway truck brake gear safety guard, guide or support device having an upright arm, a truck part having an upright wall with horizontal flanges projecting therefrom, a spring seated against said wall and normally projecting therefrom a greater distance than said flanges, there being a part rigid with and facing said wall and spaced therefrom and forming a backing and guide element, a pin movable along said element parallel to said wall and having a tapered end whereby the pin will force the upright guard member positioned between it and the wall towards the wall against the thrust of said spring.

5. In a mounting for a railway truck brake gear safety guard, guide or support device having an upright arm, a truck part having an upright wall provided with a bracket having a bar substantially parallel with, spaced from and facing said wall, and a leaf spring in said bracket with spaced portions arranged to oppose said wall and the upright arm of the brake gear device to thrust the latter towards said bar, the upper end of said spring including a hook, and detachable means seated in said bracket and engaging said hook to retain the spring in the bracket.

6. In a mounting for a railway truck brake gear safety guard, guide or support device having an upright arm including a horizontal flange terminating in a down-turned lip, a truck part having a horizontal flange with an upstanding rib at is outer end arranged to overlap said device flange and lip, said truck part and device having vertically opposing elements limiting the upward movement of said device relative to said truck part when the device is in operating position, said device being movable to engage and disengage said interlocking elements, and detachable means holding the device with said interlocking elements engaged.

7. Structure as described in claim 6 which includes a spring thrusting the device arm in one direction to prevent loose play between the same and the truck part and interlocking elements.

8. A mounting for a railway truck brake gear safety guard, guide or support device having an upright arm, comprising a truck bolster with an upright wall, a horizontal spring seat projecting therefrom, a leaf spring having a lower end carried on said seat and having a portion spaced from its lower end engaging said wall and having an upper portion extending outwardly and upwardly from said wall, there being a bracket on said wall having a portion extending around the upper end of said spring and facing said wall, the brake gear device arm having an in-turned upper end insertible between said spring and bracket portion so as to overlie the upper end of the spring and be supported by the same and also to be thrust against the bracket portion by the spring.

9. In a mounting for a railway truck brake gear safety guard, guide or support device having an upright arm, a truck part having an upright wall, a spring member seated against said wall and normally projecting laterally therefrom, there being laterally spaced projections on said wall adjacent to said member and projecting from the wall a greater distance than said member and there connected by a cross bar, said bar and spring member being arranged to receive the upright arm of the device between them, and a pin detachably seated on said bar for holding the upright arm of the device in contact with said spring member and serving as a pivot about which the arm may tilt so that the device may yield under the thrust of the brake gear part associated therewith.

10. In a mounting for a railway truck brake gear safety guard, guide or support device having an upright arm with a horizontal lip at its upper end, a truck part provided with a horizontal element projecting beneath said lip to support the same, a spring member carried by and seated against said truck part and normally projecting beneath said lip and element, there being a seat member carried by and facing said truck part and spaced therefrom, and a detachable pin seated on said seat member and cooperating with said spring member to yieldingly hold said arm in position but accommodating its tilting relative to the truck part.

11. In a mounting for a railway truck brake gear safety guard, guide or support device having an upright arm, a truck part having spaced upright members at opposite sides of said arm, a spring structure carried by said truck part and seated against one of said members and engaging one face of said arm, and a detachable element seated against the other of said members and engaging the other face of said arm to compress the spring structure.

EDWARD J. ELLIS.